United States Patent
Kawano

[11] Patent Number: 6,144,631
[45] Date of Patent: Nov. 7, 2000

[54] INFORMATION RECORDING MEDIUM, AND READOUT METHOD AND READOUT APPARATUS THEREFOR

[75] Inventor: Toshifumi Kawano, Kanagawa, Japan

[73] Assignee: Mitsubishi Chemical Corporation, Tokyo, Japan

[21] Appl. No.: 09/300,453

[22] Filed: Apr. 28, 1999

[30] Foreign Application Priority Data

Apr. 30, 1998  [JP]  Japan .................................. 10-120249

[51] Int. Cl.$^7$ ........................................... G11B 7/24
[52] U.S. Cl. ..................... 369/275.1; 369/275.4
[58] Field of Search .................. 369/275.1, 275.4, 369/275.2, 283, 284, 286, 274; 428/64.1, 64.4; 430/320, 321

[56] References Cited

U.S. PATENT DOCUMENTS

| | | | |
|---|---|---|---|
| 5,090,009 | 2/1992 | Hamada et al. | 369/284 |
| 5,233,575 | 8/1993 | Uchino et al. | |
| 5,576,102 | 11/1996 | Kisaka et al. | |
| 5,621,706 | 4/1997 | Kawano et al. | |
| 5,633,106 | 5/1997 | Aihara et al. | 430/21 |
| 5,689,497 | 11/1997 | Wilting et al. | 369/275.1 |
| 5,850,383 | 12/1998 | Kawano . | |
| 5,853,872 | 12/1998 | Shimamori et al. | |
| 5,862,123 | 1/1999 | Horie et al. | 369/275.4 |
| 5,878,022 | 3/1999 | Okada et al. | 369/275.4 |
| 5,970,027 | 10/1999 | Narita et al. | 369/13 |

*Primary Examiner*—Tan Dinh
*Attorney, Agent, or Firm*—Oblon, Spivak, McClelland, Maier & Neustadt, P.C.

[57] ABSTRACT

An information recording medium comprising a substrate provided with recessed pits or grooves, and at least a metal layer and a light transmitting layer formed on the substrate in this order, or a metal substrate provided with recessed pits or grooves, and a light transmitting layer formed on the metal substrate, so that a light is applied from the light transmitting layer side to readout information from the pits or grooves, wherein the minimum width W of the pits or grooves and the wavelength $\lambda$ in air of the readout light satisfy:

$$W/\lambda \leq 0.6 \tag{1}$$

and the refractive index n of the light transmitting layer, the thickness Tf of the light transmitting layer and the maximum depth d of the pits or grooves satisfy:

$$n \geq 1.6 \tag{2}$$

$$1.2d/n < Tf < \lambda/(2n) \tag{3}$$

15 Claims, 3 Drawing Sheets

INFORMATION RECORDING MEDIUM, AND READOUT METHOD AND READOUT APPARATUS THEREFOR

BACKGROUND OF THE INVENTION

1. Field of the Invention

The present invention relates to an information recording medium, and a readout method and readout apparatus therefor.

2. Discussion of Background

For information recording media for high density recording by means of lights, it has been common to employ a transparent substrate such as a polycarbonate resin and to apply a light to a writing layer through the substrate.

In recent years, an attempt has been made to obtain an ultra high density medium by a combination of a hard disk technology and an optical disk technology. For example, an optical system is formed on a flying head, and a light is irradiated from the writing layer side to carry out readout of information. This system is called a layer side incident system as opposed to the conventional substrate side incident system. Types of media include a ROM (read only memory) type whereby a change in reflectivity by pits formed on the substrate is readout, a write once type whereby a change in reflectivity is obtained by deforming or modifying a dye or a substrate or by forming pits by heating a layer, a magneto-optical recording type whereby a rotation of a linearly polarized light by a vertical magnetization layer is readout, and a phase change recording type whereby a change in reflectivity between a crystalline state and an amorphous state is readout.

A merit of the layer side incident system as compared with the substrate side incident system may firstly be that good signal characteristics can be obtained, as the incident light is not susceptible to a distortion by the birefringence of the substrate. Further, as compared with a case where the light is transmitted through the substrate, the aberration of light due to an inclination of the disk is small, and the margin against the inclination will be large.

For the same reason, NA (numerical aperture) of the objective lens can be increased, and accordingly, the beam spot can be made small, which makes high densification possible. By bringing the distance between the writing layer and the objective lens to a level of a few tens nm, near field optical recording by a so-called evanescent light will be possible.

On the other hand, with conventional hard disks, designation of an address for an information recording site or formation of a magnetic domain for generation of a servo signal has been carried out for every sheet, which has added to the cost for the production.

Under these circumstances, it has been studied to combine an optical disk technology and a hard disk technology to reduce the production cost to a large extent.

Namely, it has been proposed that a substrate is made of a resin, and such an address signal or a servo signal is embedded in the form of recesses (pits or grooves, which are hereinafter represented by pits) in the substrate at the same time as the resin substrate is prepared.

Such signals by pits in the substrate (hereinafter referred to as ROM signals) will be readout by applying a light to the substrate surface and detecting a change in reflectivity due to the light interference.

As a medium of the layer side incident system, a medium having servo sample pits formed, is disclosed, for example, in U.S. Pat. No. 5,202,880.

However, according to a study by the present inventors, it has been found that signals can hardly be obtainable by the layer side incident system, when the above mentioned pits are recorded in a high density. Namely, even with pits of a density at which sufficiently large signal amplitudes can be taken in the case of readout from the substrate side, only slight signals can be obtained in the case where readout is carried out by the layer side incident system. Especially when the pit width becomes narrow along the high densification, the deterioration in readout signals is remarkable as compared with the substrate side incident system.

SUMMARY OF THE INVENTION

The present inventors have conducted an extensive study to solve the above problems and, as a result, have found it possible to obtain sufficiently large ROM signals when the layer structure and the size of pits satisfy certain specific relations. Thus, the present invention provides an information recording medium comprising a substrate provided with recessed pits or grooves, and at least a metal layer and a light transmitting layer formed on the substrate in this order, or a metal substrate provided with recessed pits or grooves, and a light transmitting layer formed on the metal substrate, so that a light is applied from the light transmitting layer side to readout information from the pits or grooves, wherein the minimum width W of the pits or grooves and the wavelength $\lambda$ in air of the readout light satisfy:

$$W/\lambda \leq 0.6 \tag{1}$$

and the refractive index n of the light transmitting layer, the thickness Tf of the light transmitting layer and the maximum depth d of the pits or grooves satisfy:

$$n \geq 1.6 \tag{2}$$

$$1.2d/n < Tf < \lambda/(2n) \tag{3}$$

The present invention also provides a readout method and a readout apparatus using the above information recording medium.

In the present invention, the metal layer or the metal substrate includes not only a layer or a substrate made of a single metal but also a layer or a substrate made of an alloy.

DETAILED DESCRIPTION OF THE PREFERRED EMBODIMENTS

Firstly, an explanation will be made on the point that even with pits having a density at which a sufficiently large signal amplitude can be taken by the substrate side incident system, only slight signals can be obtained in the case where readout is carried out by the layer side incident system.

In a conventional optical recording medium, a metal layer or the like is formed on a substrate, and recesses (pits or grooves, which will herein after be represented by pits) for recording data signals, address signals, servo signals, etc., are formed on the substrate.

In the substrate side incident system which has been heretofore used, the wavelength λ' of a readout light reaching the pits of the substrate is represented by:

$$\lambda' = \lambda/ns \qquad (5)$$

Here, λ is the wavelength in air of the readout light, ns is the refractive index of the substrate.

For example, with a polycarbonate commonly employed as a substrate for an optical recording medium, ns=1.58, and accordingly, when readout light with a wavelength of 680 nm is employed, the wavelength in the substrate will be 680/1.58=430 nm.

On the other hand, in the case of the layer side incident system, the layer on the substrate is very thin, whereby the wavelength of the light reaching the pits remains to be substantially λ, whereby the wavelength will be 680 nm. Namely, in the Formula (5), ns=1.

According to the Snell's law, the numerical aperture NA' in the substrate is represented by:

$$NA' = NA/ns \qquad (6)$$

Here, NA is a numerical aperture in air.

Here, the focused spot diameter R of light is proportional to λ/NA, and the focused spot diameter R' in the substrate is proportional to λ'/NA'. Accordingly, from the above formulae (5) and (6), the following formula will be led:

$$R' = a \cdot \lambda'/NA' = a \cdot \lambda/NA = R \qquad (7)$$

wherein a is a constant.

Namely, the focused spot diameter R does not change whether it is in the substrate or in air and accordingly does not change whether the system is of substrate incident type or of layer incident type.

The resolution at the time of readout is determined by R. Accordingly, the same readout resolution should be obtained irrespective of the substrate side incident system or the layer side incident system. However, in the actual readout, the readout signals tend to remarkably decrease as the size of pits becomes small in the layer side incident system. This is attributable to the fact that the light tends to hardly penetrate into the interior of the pits, as λ increases relative to the opening diameter of the pits.

Figure 2:
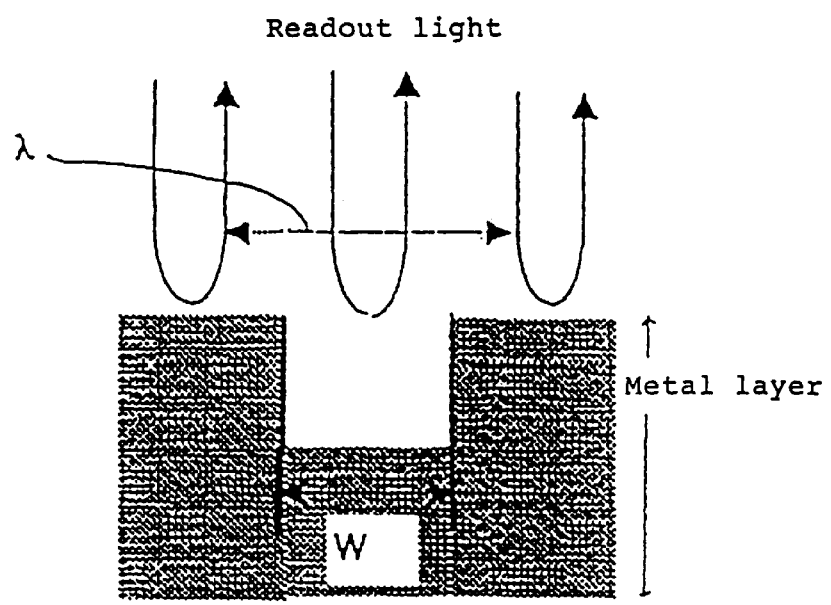
FIG. 2 is a schematic view illustrating the state of light when a pit on a metal layer of a conventional optical recording medium was readout by the layer side incident system.

Now, this will be explained with reference to the drawings. FIG. 2 is a schematic view illustrating the state of light when a pit on a metal layer of a conventional optical record medium was readout by the layer side incident system.

For example, in a case where a laser beam having a wavelength of 680 nm is focused by means of a lens having numerical aperture of 0.7, the diameter of the focused pot will be about 1 μm. If the pit width W at that time is assumed to be about 0.35 μm (350 nm), ROM signals become maximum.

The reflected light from the pit bottom surface has a phase shifted from a reflected light from the surrounding surface, whereby the reflected lights undergo an interference with each other. If the pit width W is controlled to bring the quantity of the reflected light from the pit bottom surface to be substantially equal to the quantity of the reflected light from the surrounding surface, the interference of the reflected lights with each other becomes maximum, whereby ROM signals from the pit will also be maximum.

However, if the pit width W to the wavelength λ of the readout light is small beyond a certain level, there will be a phenomenon such that the readout light will be reflected at the entrance of the pit (the upper portion of the pit), whereby there will be a problem that the readout light can not penetrate into the pit. Especially when the pit width becomes close to a half of the wavelength of the readout light, the penetration of the readout light will be substantially difficult.

In the case of the conventional substrate side incident system, even when a readout light having a wavelength of 680 nm is employed, the wavelength λ' in the substrate will be 430 nm, as mentioned above, whereby it can penetrate into a pit having a pit width of 350 nm without difficulty. Whereas, in the case of the layer side incident system, the wavelength will be 680 nm which is close to twice the pit width, whereby the readout light can not substantially penetrate into the pit. Accordingly, even at the pit portion, no phase difference results from the reflected lights, and ROM signals due to interference of the reflected lights can hardly be obtainable.

In the layer side incident system, there has been a phenomenon that ROM signals tend to be small, as described above.

Such a phenomenon appears intensely in a case where the wall surface of the pit is substantially vertical to the substrate plane, and if the wall surface sags to have a certain inclination, the light tends to easily penetrate. However, if the pit wall surface has an inclination, such will cause a fluctuation in the pit length at the time of readout, and the readout signal intensity tends to decrease. Accordingly, it is preferred that the pit wall surface is substantially vertical.

An optical recording medium of a layer side incident system has heretofore been known, but the numerical aperture of a lens used to be relatively small, and the laser beam can not be made so small, and pits used have not been so narrow. Accordingly, there has been no such a problem as described above in the case where a substantially small pit relative to the wavelength, is employed.

Figure 1:
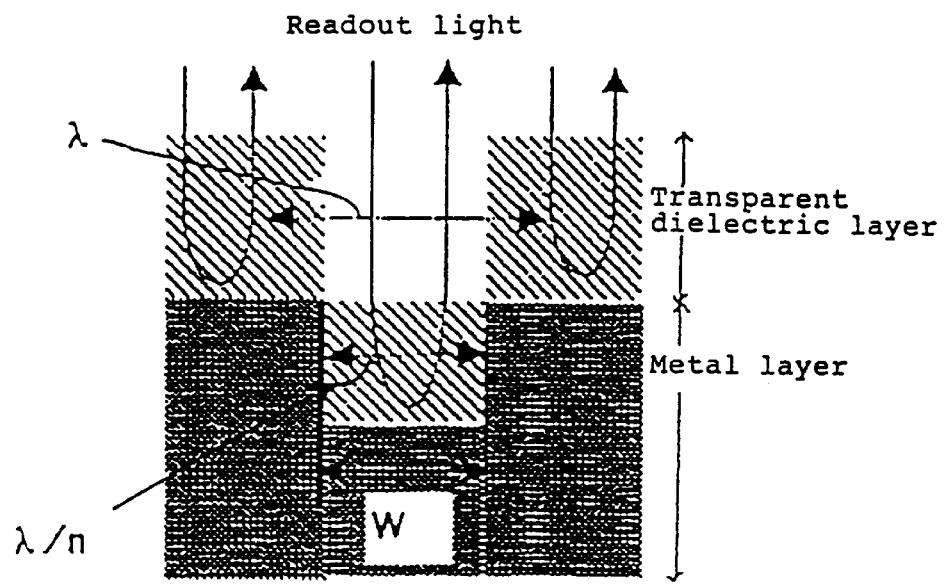
FIG. 1 is a schematic view showing the state of light when a pit on the metal layer of the information recording medium of the present invention was readout by the layer side incident system.

Whereas, FIG. 1 is a schematic view illustrating the state of light in a case where a pit on the metal layer of the information recording medium of the present invention is readout by a layer side incident system. In this medium, in order to prevent the reflection of the readout light at the entrance of the pit, at least a metal layer and a light transmitting layer having a high refractive index, are formed on a substrate in this order, or a light transmitting layer having a high refractive index is formed on a metal substrate.

The readout light reaching the entrance of the pit will firstly enter a pit formed in the light transmitting layer having a high refractive index, such as a transparent dielectric layer. In this case, the side wall is transparent, and the light can penetrate into the interior of the transparent dielectric forming the side wall. Therefore, even with a narrow pit width, the reflection at the entrance is small as compared with the case of a metal, and the light can penetrate into the inside of the pit.

The light will then reach a pit formed by the metal, and here, the inside of the pit is filled with the transparent dielectric. When the refractive index of the transparent dielectric is n, the wavelength of the light here is λ/n. When the transparent dielectric has a high refractive index, i.e. when n is sufficiently large, the substantial wavelength will be short, whereby the light can penetrate into the inside of the metal pit. Thus, the readout light will reach to the metal layer at the bottom of the pit, and by the light reflected therefrom, a large ROM signal can be obtained.

Here, "transparent" means at least transparent to a light having a wavelength of the readout light.

In the above mentioned U.S. Pat. No. 5,202,880, nothing is disclosed about the recessed pits or grooves as mentioned here. A substrate provided with a V-shaped groove for servo having a width of 0.4 $\mu$m, is disclosed, but no discussion is made with respect to the relation between the wavelength of the light to be used and the refractive index of the dielectric. In the case of a V-shaped groove, by the nature of such a shape, it is easy for a light to enter the groove, as compared with recessed pits or grooves, whereby there is no such a problem as described above.

Now, the present invention will be described in further detail. As the substrate to be used in the present invention, one prepared by injection molding of a resin such as a polycarbonate or PMMA by means of a stamper having recesses and protrusions impressed, is preferred from the viewpoint of costs and productivity. There may be a method in which an ultraviolet curable resin, a thermosetting resin or the like is coated on glass, metal or the like, and the coated resin is cured in a state where the stamper is intimately in contact therewith, or a method wherein glass or a metal such as an aluminum alloy may be molded by cast molding.

The recesses and protrusions formed on a substrate by such a method may, for example, be those representing record data, those for generating servo signals to follow a recording track, those showing the address of a recording zone or those for forming a readout clock. For the servo signals, either a method of generating them by a continuous groove (a continuous groove system) or a method of producing them from pits formed as spaced from one another (a sample servo system), may be employed.

The shape of the pits may, for example, be circular or oval, but the above described problem occurs if the minimum width W of the pits or grooves is small relative to the wavelength $\lambda$ in air of the readout light. The present invention is effective when W and $\lambda$ satisfy:

$$W/\lambda \leq 0.6 \quad (1)$$

It is more effective when $W/\lambda \leq 0.55$. Particularly effective is a case where $W/\lambda \leq 0.5$.

With conventional optical recording media, for example in the case of compact discs, the minimum pit width is from about 0.7 to 0.8 $\mu$m, and the wavelength is from 780 to 830 nm, and accordingly, $W/\lambda$ is as large as 0.84 even at the smallest.

In the present invention, a light transmitting layer is formed on a metal layer or a metal substrate. In order to let the light penetrate into pits formed in the metal layer or the metal substrate, the refractive index n of the light transmitting layer is adjusted to be:

$$n \geq 1.6 \quad (2)$$

more preferably $n \geq 1.7$.

The light transmitting layer is required to be transparent and has a high refractive index. For this reason, it is preferably made of a transparent inorganic substance, and more preferably, it is made of a transparent dielectric substance. The transparent dielectric substance may, for example, be Si oxide, Si nitride, Ta oxide, Ti oxide, Al oxide, Al nitride, ZnS or ZnSe. Among them, Si nitride, Al nitride or ZnS, which contains no oxygen, is preferred, since no oxidation of the metal layer will thereby be brought about.

The light transmitting layer may be formed by two or more layers which are different from one another. In such a case, the refractive index n of the light transmitting layer will be represented by:

$$n=(n1d1+n2d2+\ldots)/(d1+d2+\ldots)$$

where n1, n2 . . . represent the refractive indexes of the respective layers, and d1, d2 . . . represent the thicknesses of the respective layers.

In a case where the metal layer which is in contact with the light transmitting layer, is a magnetic layer, it is preferred that at least the layer which is in contact with the magnetic layer, is made to be a nitride layer in order to prevent oxidation of the magnetic layer.

In order to minimize the change in reflectivity due to a change in the thickness of the light transmitting layer, it is preferred to arrange the plurality of layers so that the refractive indexes of the layers decrease outwardly from the inside of the medium. For example, a Si nitride layer having a refractive index of 2.0 may be formed in a thickness of about 60 nm in contact with the magnetic layer and then a Si oxide layer having a refractive index of 1.5 may be formed in a thickness of about 70 nm thereon.

In order to obtain the effect to let the readout light penetrate into pits by filling the pits on the metal layer with a substance constituting the light transmitting layer such as a dielectric substance, a substantial portion in depth of the pits is required to be filled with the dielectric substance. However, if the refractive index of the dielectric substance becomes high, the light becomes more readily penetrable, whereby the required thickness of the dielectric substance decreases.

As a result of a study by the present inventors, it has been found necessary to set the thickness of the light transmitting layer thicker than a certain level in order to obtain adequate ROM signals. Namely, the refractive index n of the light transmitting layer, the thickness Tf of the light transmitting layer and the maximum depth d of the pits or grooves are required to satisfy the relation represented by:

$$1.2d/n<Tf$$

more preferably, 1.3d/n<Tf, most preferably, 1.4d/n <Tf.

The depth d of pits, at which the interference effect becomes maximum to obtain ROM signals, is $\lambda/4$. Accordingly, in a case where the wavelength $\lambda$ of the readout light is 780 nm, the maximum interference effect can be obtained when the depth d of pits is about 195 nm by the layer side incident system. For example, when the refractive index n of the light transmitting layer is 2.0, and the depth d of pits is 195 nm, from the above relation, Tf is required to be thicker than 117 nm.

With magneto-optical recording media, it has heretofore been known to form a thin transparent dielectric layer on the incident light side of a magneto-optical recording layer. This is intended not only for the protection of the recording layer but also to reduce the reflectivity by the interference effect thereby to reduce a noise and increase the light utilization efficiency, so as to improve the recording sensitivity.

With the above combination of the refractive index and the wavelength (n=2.0, $\lambda$=780), the effect for reducing the reflectivity becomes maximum when the thickness of the transparent dielectric layer is from 70 to 80 nm. It has heretofore been common to employ a layer thickness in the vicinity of this range. For example, in U.S. Pat. No. 5,202,880, silicone nitride having a layer thickness of from 40 to 80 nm is employed. However, in order to obtain high ROM signals as in the present invention, it is necessary to employ a layer thickness thicker than the layer thickness which used to be employed to minimize the reflectivity.

On the other hand, if the thickness Tf of the light transmitting layer is too large, ROM signals will inversely decrease. This is believed attributable to the fact that the distance between the light transmitting layer surface and the metal layer surface is too much, whereby interference of reflected lights from the two surfaces tends to be incomplete. Further, if Tf is too thick, there will be a problem that the productivity will be poor. From such viewpoints, the upper limit of Tf is:

$$Tf<\lambda/(2n)$$

more preferably, $Tf<\lambda/(2.5n)$.

The minimum width W of the pits or grooves is preferably at a proper level relative to the focused spot diameter, and accordingly, it is preferably within a range represented by:

$$\lambda/(4\cdot NA)<W<\lambda/(2\cdot NA) \qquad (8)$$

where NA is the numerical aperture of the objective lens.

With respect to the depth d of the pits, it is common to adjust it to a depth in the vicinity of $\lambda/4$, where $\lambda$ is the wavelength of the readout light, in order to maximize the interference effect. However, in a case where the wavelength of the readout light is small relative to the pit width, as in the present invention, the light will hardly penetrate into the bottom surface of pits. Accordingly, it is preferred to make pits deeper than usual. A preferred range is $d/5<\lambda<d/3$. More preferred is a range of $d/4<\lambda<d/3$. Most preferred is a range of $d/3.8<\lambda<d/3.2$.

The present invention is applicable to all of the ROM (read only memory) type, the phase change recording type and the magneto-optical recording type, so long as they are media, wherein recessed pits are formed on a metal layer or a metal substrate. However, it is particularly preferred to use it for magneto-optical recording media. In the case of a layer side incident system, recording in a magnetic field modulation system becomes possible with magneto-optical recording media in the same manner as with magnetic recording media, whereby extremely accurate recording will be possible. Further, there is no change in reflectivity after recording, whereby there will be no disturbance of servo signals for tracking the recording track.

Further, the magnet recording media have characteristics such that the recording power may be small as compared with the phase change media, and the repetitive recording durability is far superior to the phase change media. In the case of the magneto-optical recording, a linearly polarized light is used for readout, and in the case of the linearly polarized light, deterioration of ROM signals is substantial as compared with a circularly polarized light. Therefore, the effect of employing the present invention is particularly remarkable.

For example, at least a part of the metal layer may be made to be a magneto-optical recording layer of e.g. TbFeCo, DyFeCo or GdFeCo. It is also a preferred mode that different magnetic layers are laminated to form a magnetically induced super resolution medium. In such a case, it is preferred to dispose TbFeCo on the substrate side and GdFeCo on the readout side.

For the purpose of light reflection or heat dissipation, it is possible to form on the substrate side of the magneto-optical recording layer a metal layer having a higher reflectivity or higher heat dissipation efficiency than the magnetic layer, which is made of Al, Au or Ag, or an alloy containing such a metal as the main component. Further, a dielectric layer of e.g. Si nitride may also be provided between the magneto-optical recording layer and the metal layer, or between the magneto-optical recording layer and the substrate. This is effective to prevent oxidation of the magnet-optical recording layer or to control the heat dissipation.

On such a metal layer, the above mentioned light transmitting layer is further formed.

For readout of such a medium, it is preferred to employ a flying head having an optical system built-in. If a flying head is used for readout, the distance between the medium and the head can be maintained to be constant by the effect of air bearing, whereby a conventional focus servo will be unnecessary, thus leading to simplification of the apparatus and speeding up of the access speed.

Further, as the distance between the medium and the head can be made very small, near field optical recording and readout by evanescent light will be possible by a combination with a solid emulsion lens.

When a flying head is employed, it is preferred to coat a lubricant on the light transmitting layer in a thickness of from 1 to 10 nm. With the thickness of this level, there will be no substantial influence over the ROM signals.

If dust deposits on the layer side, the flying head is likely to crush thereto and break. Therefore, it is preferred to prevent dust by accommodating one to a few information recording media in a closed box or a closed cartridge. In a case where a few media are to be accommodated in a cartridge, all of them may have the same specification or may have different specifications, for example a combination of a ROM medium and an magneto-optical recording medium.

In the case of a ROM medium, a metal layer of e.g. Al, Au, Ag or Cu is formed on the substrate. Particularly preferred is a highly reflective metal layer having a reflectivity of at least 60%. Preferred is Al or Ag, or an alloy thereof with at most 5% of an additive such as Ti, Cr, Ta, W or Si. In order to improve the adhesion, a dielectric layer of e.g. Si oxide, Si nitride or Ta oxide may be provided between the metal layer and the substrate.

The thickness of the metal layer is preferably at least 30 nm so that the readout light will sufficiently reflect. However, from the viewpoint of the productivity, it is preferably at most 200 nm. Then, the above mentioned light transmitting layer is provided on the metal layer. If the light transmitting layer is made of a transparent dielectric layer, it is also possible to obtain a protective effect for the metal layer.

Further, when the present invention is applied to a phase change recording medium, at least a part of the metal layer is made to be a phase change recording layer of e.g. GeSbTe or AgInSbTe. In such a case, as the light transmitting material, $ZnS-SiO_2$ is preferred, which also has an effect of improving repetitive recording durability.

The information recording medium of the present invention is designed to readout by light at least ROM signals for servo or address information from the recessed pits or grooves, but recording of the information may be carried out by recording by means of a magnetic head. Even with a magnetic recording medium, it is possible to obtain servo signals or address signals by readout by light, whereby the servo will be accurate, and the track density can be increased. Further, it is possible to record servo information or address information on the substrate by collective transfer, whereby the formatting cost can be reduced.

Here, a method is also conceivable to reduce the coercive force by heating the recording portion with e.g. a laser.

Further, readout of the information may be carried out by detection of a leakage flux in the same manner as in the case of a usual magnetic disc. As the magnetic layer, either a laterally magnetized layer or a vertically magnetized layer may be employed. In the case of a laterally magnetized layer, it is possible to employ a magnetic material which is commonly used for a magnetic disc as a recording layer, such as CoCrTa. In the case of a vertically magnetized layer, the magnetic material may, for example, be CoCr or a rare earth transition metal alloy.

It is a preferred mode for high density recording that the recording medium has a land surface and a groove surface separated by a side surface which is substantially vertical to the substrate plane, and recording is carried out on both the land surface and the groove surface.

Now, the present invention will be described in further detail with reference to Examples. However, it should be understood that the present invention is by no means restricted to such specific Examples.

EXAMPLE 1

By means of injection molding of a polycarbonate, a substrate having a thickness of 1.2 mm and a diameter of 130 mm and having recessed pits formed on both sides, was prepared. The pits included servo pits to obtain track servo signals by means of a sample servo system, pits representing address information and pits for forming a clock. The minimum width W of the pits was varied so that W/$\lambda$ ranged from 0.46 to 0.67, where $\lambda$ is the wavelength (680 nm) of the readout light. The maximum depth d of pits was 163 nm.

This substrate was mounted on a sputtering apparatus, and 30 nm of an $Al_{97}Ta_3$ alloy, 30 nm of Si nitride, 40 nm of $Tb_{22}(Fe_{80}Co_{20})_{78}$, 90 nm of $Gd_{31}(Fe_{80}Co_{20})_{69}$ and Si nitride having a layer thickness Tf of 120 nm, were formed. The refractive index of Si nitride was 2.0.

Figure 3:
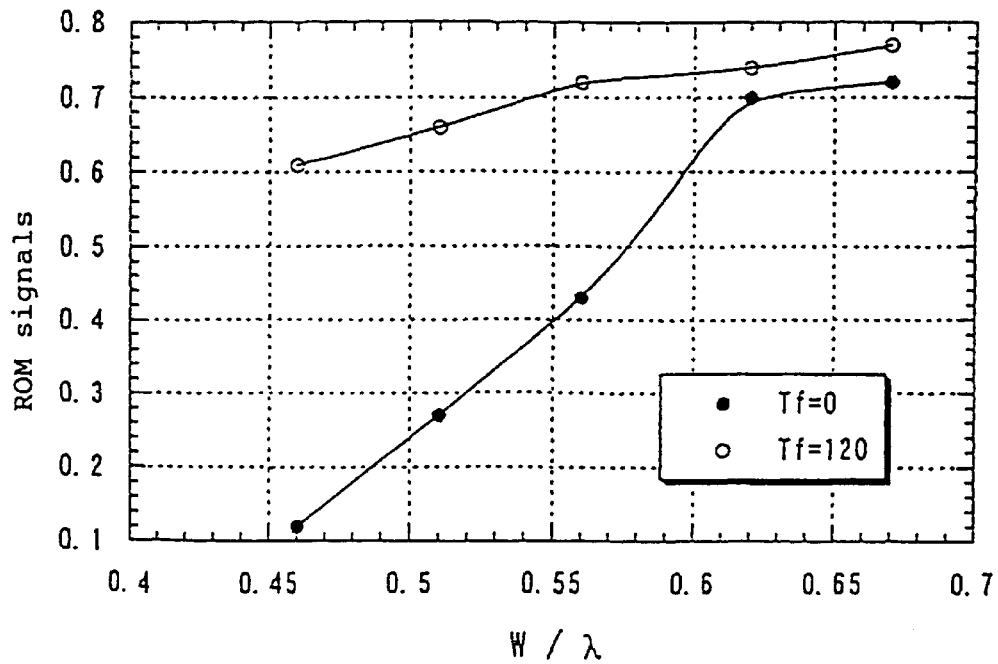
FIG. 3 is a graph showing the changes of ROM signals to W/$\lambda$ and Tf in Example 1 and Comparative Example 1.

Using a tester having a readout light wavelength $\lambda$ of 680 nm, the change in the ROM signals to W/$\lambda$ was measured, and the results are shown in FIG. 3. The definition of the ROM signals is that the maximum amplitude of the signals by the pits is divided by the signal level of the mirror surface portion.

Using the same tester, marks having a mark length of 0.5 $\mu$m were recorded, and magneto-optical signals were readout. At that time, with a readout power of 1.5 mW, CNR was 36 dB, but with a readout power of 3 mW, CNR of 47 dB was obtained, whereby the effect for magnetically induced super resolution was confirmed.

COMPARATIVE EXAMPLE 1

A medium was prepared in the same manner in Example 1 except that the outer most layer of Si nitride was not formed (i.e. Tf=0). Using the same tester as used in Example 1, ROM signals were measured, and the results are shown in FIG. 3. A substantial decrease in the ROM signals was observed when W/$\lambda$ was 0.6 or less.

EXAMPLE 2

A medium was prepared in the same manner as in Example 1 except that W/$\lambda$=0.46, d=163 nm, and the thickness and the refractive index of the dielectric surface layer were changed. As the transparent dielectric substance, Ta oxide (n=2.2), Si nitride (n=2.0), Al oxide (n=1.7) and Si oxide (n=1.5) were used.

Figure 4:
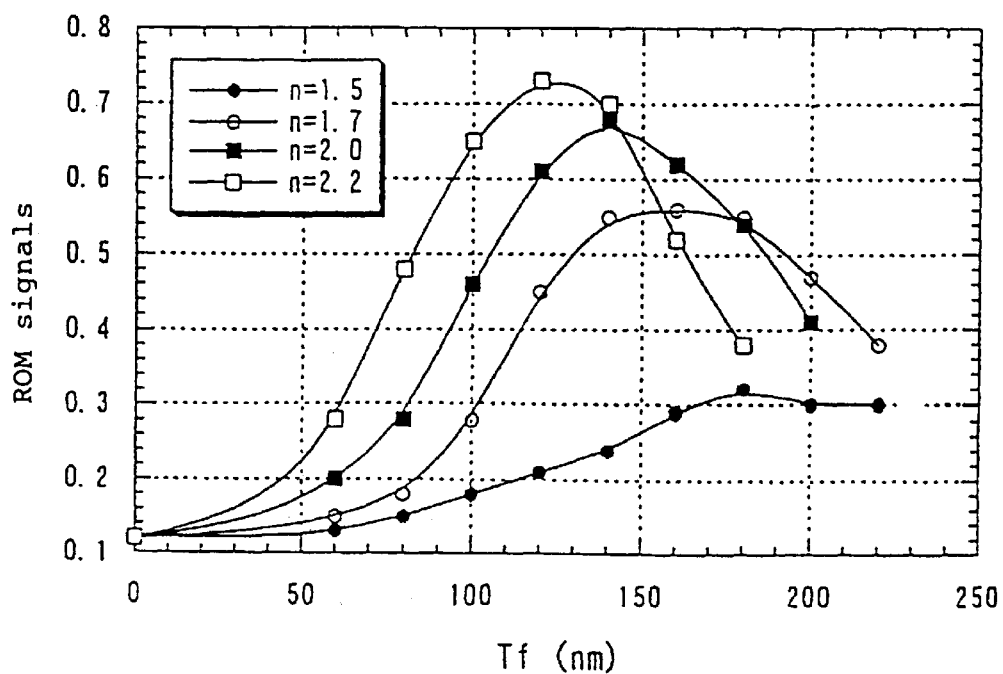
FIG. 4 is a graph showing the changes of ROM signals to Tf and n in Example 2.

Using the same tester as in Example 1, ROM signals were measured, and the results are shown in FIG. 4. It is evident that except for the case where n=1.5, high ROM signals were obtained.

The thickness Tf of the light transmitting layer corresponding to 1.2d/n is 115 nm with n=1.7, 98 nm with n=2.0 and 89 nm with n=2.2. According to FIG. 4, it is evident that with the respective dielectric substances, high ROM signals were obtained in a thickness corresponding to 1.2d/n or more.

Tf corresponding to $\lambda/(2n)$ is 200 nm with n=1.7, 170 nm with n=2.0 and 155 nm with n=2.2, and it is evident that in a higher thickness, the ROM signals decreased substantially.

EXAMPLE 3

Figure 5:
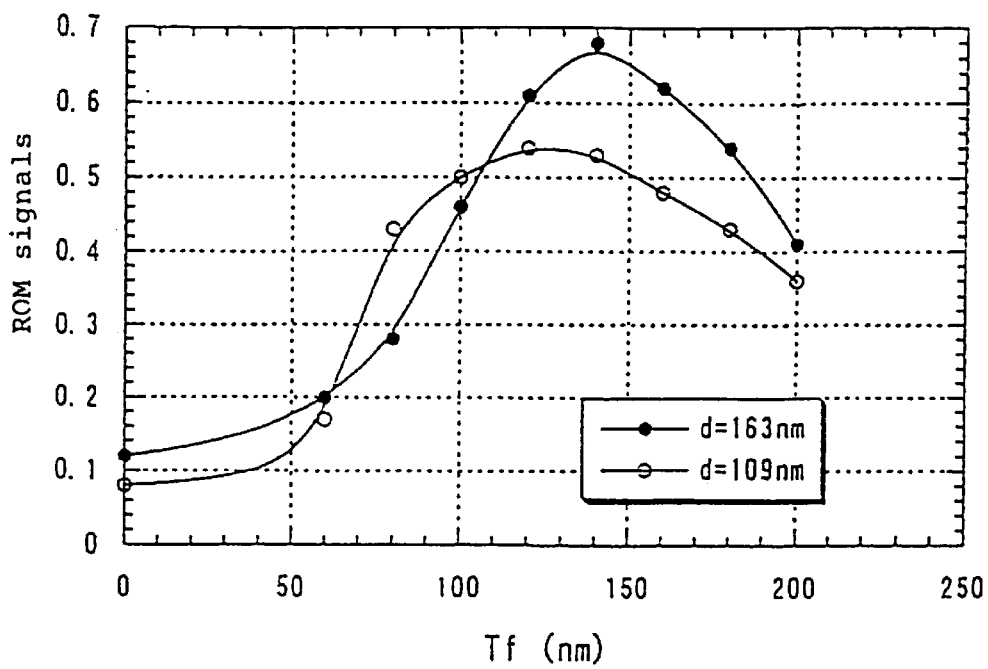
FIG. 5 is a graph showing the changes of ROM signals to Tf and d in Example 3.

A medium was prepared in the same manner as in Example 1 except that W/$\lambda$=0.46, n=2.0, d was two types of 163 nm and 109 nm, and Tf was varied from 0 to 200 nm. Using the same tester as used in Example 1, ROM signals were measured, and the results are shown in FIG. 5.

Tf corresponding to 1.2d/n was 98 nm with d=163 nm and 65 nm with d=109 nm, and it is evident that in a thickness of at least this level, high ROM signals were obtained.

EXAMPLE 4

Figure 6:
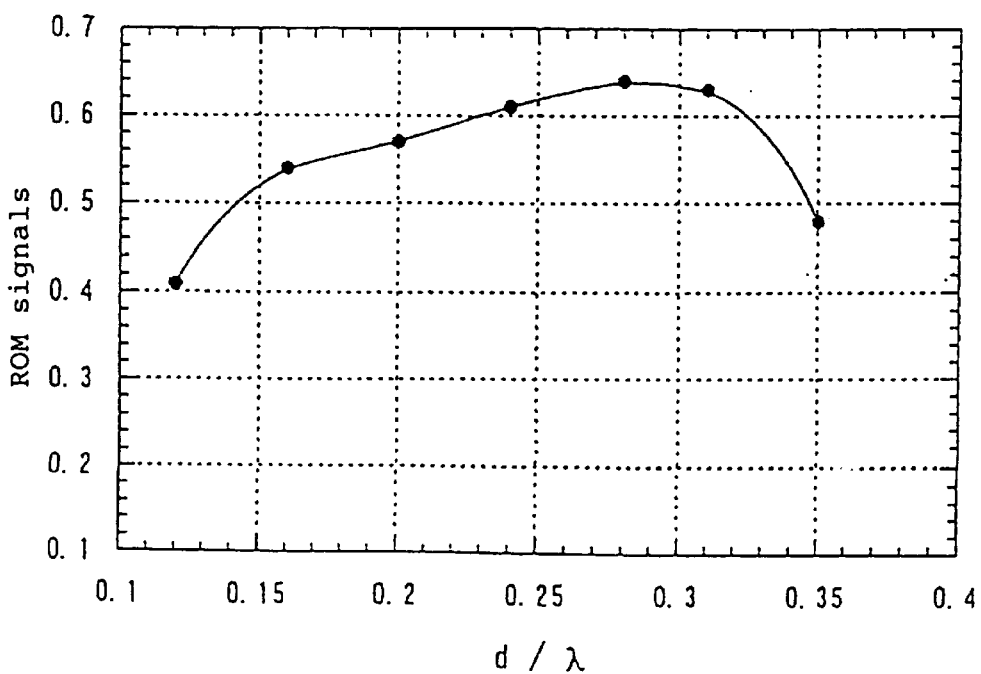
FIG. 6 is a graph showing the change of ROM signals to d/$\lambda$ in Example 4.

A medium was prepared in the same manner as in Example 1 except that W/$\lambda$=0.46, n=2.0, Tf=120 nm, and d/$\lambda$ was varied from 0.12 to 0.35. Using the same tester as used in Example 1, ROM signals were measured, and the results are shown in FIG. 6. The ROM signals became maximum in the vicinity of d/$\lambda$=0.28.

EXAMPLE 5

On a substrate with W/$\lambda$=0.46 and d=163 nm, 80 nm of $Al_{97}Ta_3$ was formed, and Si nitride with n=2.0 and Tf=120 nm was formed thereon. The ROM signals before and after forming the Si nitride were compared. Before forming the Si nitride (Tf=0), the ROM signals were 0.12, but after forming it, the ROM signals increased to 0.55.

EXAMPLE 6

With W/$\lambda$=0.46, d=163 nm, n=2.0 and Tf=120 nm, up to the transparent dielectric layer was formed in the same manner as in Example 1, and 2 nm of a fluorine type lubricant was coated thereon. The ROM signals before and after the coating were not changed at 0.61. Using this medium, CSS (contact start and stop) test was carried out by a flying head, whereby up to 1,000 times, no scratch mark was observed on the medium.

According to the present invention, it is possible to provide an information recording medium, and a readout method and readout apparatus, whereby high density recording is possible, and large readout signals can be obtained from recessed pits or grooves even by the layer side incident system.

What is claimed is:

1. An information recording medium comprising a substrate provided with recessed pits or grooves, and at least a metal layer and a light transmitting layer formed on the substrate in this order, or a metal substrate provided with recessed pits or grooves, and a light transmitting layer formed on the metal substrate, so that a light is applied from the light transmitting layer side to readout information from the pits or grooves, wherein the minimum width W of the pits or grooves and the wavelength $\lambda$ in air of the readout light satisfy:

$$W/\lambda \leq 0.6$$

and the refractive index n of the light transmitting layer, the thickness Tf of the light transmitting layer and the maximum depth d of the pits or grooves satisfy:

$n \geq 1.6$ $1.2d/n < Tf < \lambda/(2n)$.

2. The information recording medium according to claim 1, wherein the light transmitting layer is made of a transparent inorganic substance.

3. The information recording medium according to claim 1, wherein the light transmitting layer is made of a transparent dielectric substance.

4. The information recording medium according to claim 1, wherein at least a metal layer and a transparent dielectric layer are formed on the substrate in this order, and the substrate is provided with recessed pits or grooves for recording information or for obtaining servo signals, so that a light is applied from the transparent dielectric layer side for readout.

5. The information recording medium according to claim 1, wherein the maximum depth d of the pits or grooves satisfies the following formula:

$d/5 < \lambda < d/3$.

6. The information recording medium according to claim 1, wherein at least a part of the metal layer is a magneto-optical recording layer.

7. The information recording medium according to claim 1, wherein at least a part of the metal layer is a vertical magnetic recording layer.

8. The information recording medium according to claim 1, wherein at least a partial wall surface of the pits or grooves is substantially vertical to the substrate plane.

9. The information recording medium according to claim 8, which has a land surface and a groove surface which are parallel to the substrate plane, and a wall surface separating the land surface and the groove surface is substantially vertical to the substrate plane.

10. The information recording medium according to claim 9, wherein information is recordable on both the land surface and the groove surface.

11. The information recording medium according to claim 1, which is of a ROM type.

12. A readout method for an information recording medium comprising a substrate provided with recessed pits or grooves and at least a metal layer and a light transmitting layer formed on the substrate in this order, or a metal substrate provided with recessed pits or grooves, and a light transmitting layer formed on the metal substrate, so that a light is applied from the light transmitting layer side to read out information from the pits or grooves, wherein the minimum width W of the pits or grooves and the wavelength $\lambda$ in air of the readout light satisfy:

$W/\lambda \leq 0.6$ and the refractive index n of the light transmitting layer, the thickness Tf of the light transmitting layer and the maximum depth d of the pits or grooves satisfy:

$n \geq 1.6$ $1.2d/n < Tf < \lambda/(2n)$, said method comprising:
carrying out readout using a flying head having an optical system built-in.

13. The readout method according to claim 12, wherein a light is applied and its reflected light is detected to readout servo information or address information from the pits or grooves, and readout of data information is carried out by detecting a leakage flux.

14. A readout apparatus comprising an information recording medium having a substrate provided with recessed pits or grooves, and at least a metal layer and a light transmitting layer formed on the substrate in this order, or a metal substrate provided with recessed pits or grooves, and a light transmitting layer formed on the metal substrate, so that a light is applied from the light transmitting layer side to readout information from the pits or grooves, wherein the minimum width W of the pits or grooves and the wavelength $\lambda$ in air of the readout light satisfy:

$W/\lambda \leq 0.6$ and the refractive index n of the light transmitting layer, the thickness Tf of the light transmitting layer and the maximum depth d of the pits or grooves satisfy:

$n \geq 1.6$ $1.2d/n < Tf < \lambda/(2n)$, and the readout apparatus further includes a flying head having an optical system built-in for readout of the medium.

15. The readout apparatus according to claim 14, wherein said flying head is configured to apply a light to the medium and detect its reflected light to readout servo information or address information from the pits or grooves, and a magnetic detector system to detect a leakage flux.

* * * * *